United States Patent
Hammerschmidt

(10) Patent No.: US 8,868,290 B2
(45) Date of Patent: Oct. 21, 2014

(54) WHEEL SPEED SENSOR WITH SUPPORT FOR INDIRECT TIRE PRESSURE MONITORING

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 17 days.

(21) Appl. No.: 13/734,320

(22) Filed: Jan. 4, 2013

(65) Prior Publication Data
US 2014/0195104 A1   Jul. 10, 2014

(51) Int. Cl.
*B60C 23/00*   (2006.01)

(52) U.S. Cl.
CPC ..................................... *B60C 23/00* (2013.01)
USPC ......... 701/32.7; 73/146.2; 73/146.5; 340/442

(58) Field of Classification Search
CPC ...... B60C 23/00; B60C 23/02; B60C 23/061; B60C 23/062; B60C 23/04; B60C 23/0425
USPC ............... 701/32.7; 73/146.2, 146.5; 340/442
See application file for complete search history.

(56) References Cited

U.S. PATENT DOCUMENTS

2006/0212193 A1*  9/2006  Breed .............................. 701/29
2012/0304754 A1* 12/2012  Oshiro et al. ................... 73/146
2013/0104640 A1*  5/2013  Gotschlich ................... 73/146.5

OTHER PUBLICATIONS

Infineon Technologies "Differential Two-Wire Hall Effect Sensor IC TLE4942—TLE4942C Data Sheet." Feb. 2002. 18 Pages.
Philips Semiconductors "KMI22/1 Data Sheet: Rotational Speef Sensor for Extenced Air Gap Application and Direction Detection." Sep. 4, 2000. 16 Pages.
Infineon Technologies AG Smart Hall Effect ICs for Active Wheel Speed Sensing TLE4941/4941C Product Brief. Published in 2006. 2 Pages.
Lee, et al. "Wavelet Analysis: Theory and Applications." Hewlett-Packard Journal, Dec. 1994. 9 Pages.
Niclas Persson "Estimation Properties of a Tire Pressure Monitoring System." Department of Electrical Engineering, Linkoepings University, Linkoeping Sweden, Oct. 22, 2002. 8 Pages.
Niclas Persson, et al. "Indirect Tire Pressure Monitoring Using Sensor Fusion." Department of Electrical Engineering, Linkoepings University, Linkoeping Sweden, Oct. 22, 2002. 8 Pages.

* cited by examiner

*Primary Examiner* — James Trammell
*Assistant Examiner* — Brian P Sweeney
(74) *Attorney, Agent, or Firm* — Eschweiler & Associates, LLC

(57) ABSTRACT

The present disclosure relate to an indirect tire pressure monitoring system (TPMS). In some embodiments, the indirect TPMS has magnetic field sensor that detects a modulated magnetic field indicative of one or more resonance parameters of an automobile tire. The magnetic field sensor generates a modulated sensor signal based upon the modulated magnetic field. An analog-to-digital converter (ADC) converts the modulated sensor signal to a digital sensor signal, which is provided to a digital signal processing unit that perform analysis of the digital sensor signal to determine the one or more resonance parameters. A communication interface transmit data corresponding to the one or more resonance parameters to an electronic control unit (ECU).

24 Claims, 7 Drawing Sheets

WHEEL SPEED SENSOR WITH SUPPORT FOR INDIRECT TIRE PRESSURE MONITORING

BACKGROUND

Tire pressure monitoring systems can be implemented as direct tire pressure monitoring systems or indirect tire pressure monitoring systems. Direct tire pressure monitoring systems (TPMS) employ pressure sensors mounted in or on each tire to physically measure the tire pressure in each tire. Indirect TPMS do not use physical pressure sensors, but instead indirectly measure tire pressure by monitoring other available signals such as individual wheel rotational speeds (e.g., detected by an automatic braking system wheel speed sensor).

In the United States, TPMS are required to measure tire pressure of individual tires within a tolerance of +/−20%. While indirect TPMS systems are reliable, they do not meet the 20% requirement. For example, an indirect TPMS using a rolling speed comparator wouldn't detected if all tires of an automobile are equally deflated due to a temperature change. Therefore, in the United States TPMS systems often comprise a tire pressure sensor in every tire with a battery and a transponder to send signals to an electronic control unit. Such systems are costly since they require a sensor in every tire and are service intensive since they are battery driven.

DETAILED DESCRIPTION

Figure 1A:
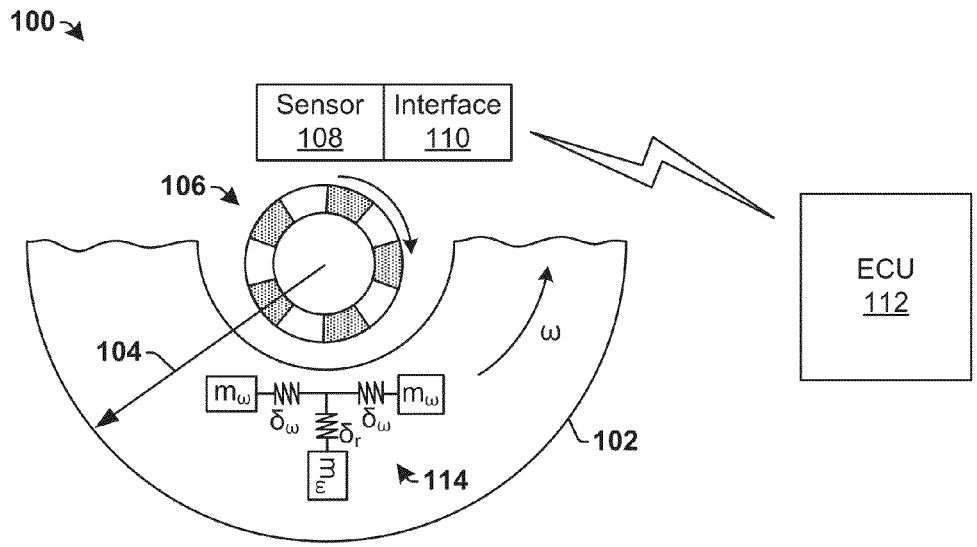
FIG. 1A is a block diagram of a conventional indirect tire pressure monitoring system (TPMS).

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

FIG. 1A illustrates an indirect tire pressure monitoring systems (TPMS) 100. The indirect TPMS 100 comprises a tire 102. Deflation of the tire 102 causes the tire 102 to operate according to different resonance frequencies or q-factors for a given mode of oscillation and/or vibration, illustrated by mass spring system 114. For example, angular vibrations $\delta_\omega$, cause torque in a sidewall of the tire 102 that either increases the angular velocity ω of the tire 102 (if vibration is in a same direction as tire rotation) or decreases the angular velocity ω of the tire 102 (if vibration in is an opposite direction as tire rotation). Similarly, radial vibrations $\delta_r$ cause a change in the radius of the tire 102 that either increase the angular velocity ω of the tire (if radius is decreased) or decrease the angular velocity ω of the tire (if radius of tire is increased). It will be appreciated that the illustrated radial and angular resonances of mass spring system 114 are simplifications of more complicated oscillation modes of an actual tire.

Indirect TPMS 100 operates using a wheel speed sensor comprising a magnetic field sensor 108 configured to detect a magnetic field generated by a magnetic pole wheel 106 that is positioned along an axis 104 of the tire 102. The magnetic pole wheel 106 comprises alternating magnetic poles that generate a modulated magnetic field that varies depending upon the wheel speed and is thus influenced by the modes of oscillation and/or vibration as well. The magnetic field sensor 108 is connected to a communication interface 110 that transmits a current 124 to an electronic control unit (ECU) 112 via a protocol designed for an anti-lock breaking system (ABS).

Figure 1B:
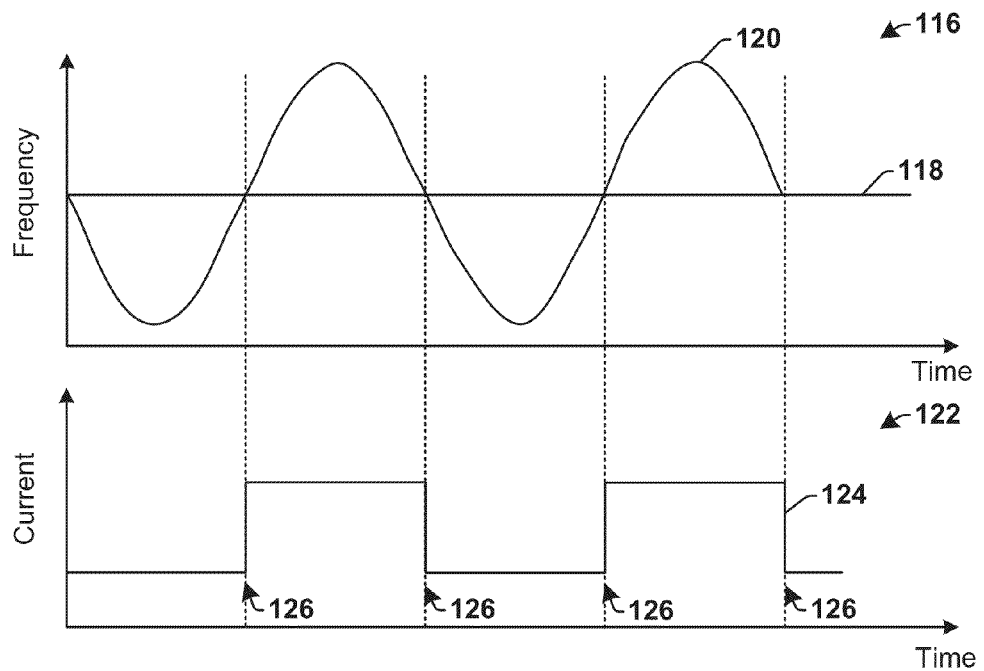
FIG. 1B is a timing diagram showing operation of the conventional indirect TPMS of FIG. 1A.

As shown in graph 116 of FIG. 1B, the magnetic field sensor 108 is configured to find an average 118 of the sensor signal 120, to compare the average 118 with the sensor signal 120 to detect zero crossings of the magnetic field, and to convert the zero crossings to a current 124 (shown in graph 122) corresponding to the ABS protocol. As shown in graph 122, if the sensor signal 120 is less than the average 118 the sensor outputs a current of 7 mA, while if the sensor signal 120 is greater than the average 118 the sensor increases current consumption by step of 7 mA.

The ECU 112 receives the current 124 and converts it into a voltage, from which the ECU can detect zero crossings of the sensor signal. The ECU 112 then operates a TPMS algorithm to measure a time between zero crossings, calculates the wheel speed which is reciprocal to the time, and then performs a time to frequency transformation of the wheel speed to detect resonance oscillations.

The ABS protocol transmitted by communication interface 110 reduces the information available to the ECU 112 for the spectral analysis to a small number of samples 126 that correspond to the zero crossings of the sensor signal. The small number of samples 126 increase the effect of noise in indirect TPMS 100, since noise is added to the sensor signal 120 around a zero crossing point is highly amplified (e.g., a positive noise contribution causes switching to be earlier, while a negative noise contribution causes switching to be delayed). The highly amplified noise results in a high noise level with a spectral density analyzed by the ECU 112.

Accordingly, the present disclosure relates to an indirect tire pressure monitoring system (TPMS) comprising a digital signal processing unit configured to reduce the effect of noise by characterization of resonance parameters from a sensor signal available inside of a tire pressure sensor. The indirect TPMS comprises a magnetic field sensor configured to detect a modulated magnetic field indicative of a wheel speed and one or more resonances parameters of an automobile tire and to generate a modulated sensor signal based upon the modulated magnetic field. An analog-to-digital converter (ADC) is configured to convert the modulated sensor signal to a digital sensor signal, which is provided to a digital signal processing unit configured to perform analysis of the digital sensor signal to determine a characteristic of one or more resonances parameters (e.g., frequencies, q-factors, etc.). A communication interface is configured to transmit data corresponding to the one or more resonance parameters to an electronic control unit (ECU). By performing the digital signal processing prior to transmitting the data to the ECU, the digital signal processing unit is able to operate on a high resolution digital sensor to reduce the effect of noise.

Figure 2:
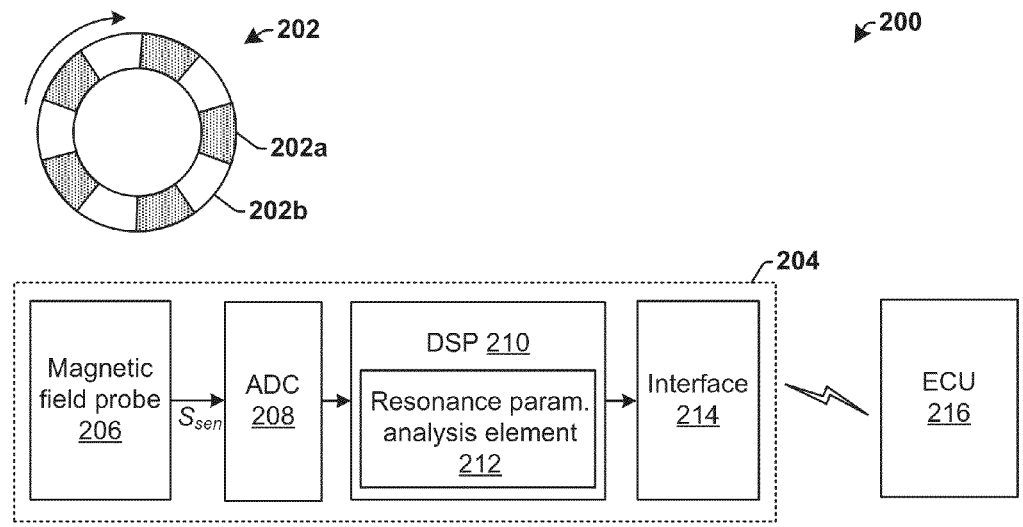
FIG. 2 is a block diagram of a disclosed indirect TPMS configured to analyze a sensor signal to determine a wheel speed and resonance frequencies within a sensor.

FIG. 2 is a block diagram of a disclosed indirect tire pressure monitoring system (TPMS) 200.

The indirect tire pressure monitoring system (TPMS) comprises a sensor housing 204 configured to house a magnetic field sensor 206, an analog-to-digital converter (ADC) 208, a digital signal processing unit 210, and a communication interface 214. In some embodiments, the sensor housing 204 may be positioned along an axis of a tire.

The magnetic field sensor 206 is configured to operate as a wheel speed sensor that measures a rotational speed of a tire by detecting a magnetic field generated by a magnetic pole wheel 202. The magnetic pole wheel 202 comprises alternating section, 202a and 202b, which have opposing magnetic polarities, so as to generate a modulated magnetic field having a value that varies depending on one or more resonance frequencies of a tire. The magnetic field sensor 206 is configured to measure the modulated magnetic field and to generate a modulated sensor signal $S_{sen}$ that varies at a frequency that is proportional to a rotational speed of a tire.

The modulated sensor signal $S_{sen}$ is output to ADC 208, which is configured to convert the sensor signal $S_{sen}$ from an analog signal to a digital signal. The digital signal is provided to the digital signal processing unit 210. The digital signal processing unit 210 comprises a resonance parameter analysis element 212 configured to receive the digital sensor signal and to perform spectral analysis of the digital sensor signal to determine one or more resonance parameters (e.g., radial and/or angular resonance frequencies or their corresponding q-factors) of the tire. In some embodiments, the digital signal processing unit 210 may further determine a wheel speed from the digital sensor signal.

Communication interface 214 is configured to transmit data (e.g., values) corresponding to the one or more resonance parameters to an electronic control unit (ECU) 216 by way of a wireless or wired connection. In some embodiments, the data may comprise the frequency and/or amplitude of resonance peaks. In other embodiments, the data may comprise a low frequency part of the spectral density of the demodulated signal or a compressed version of the low frequency part of the spectral density without detection the frequency peaks. Transmitting a low frequency part of the spectral density allows for the ECU 21c to execute complex algorithms to detect resonance parameters (e.g., algorithms that have a dependency on tire specific and/or car specific characteristics).

Changes in the data (e.g., the one or more resonance parameters) can subsequently be analyzed by the ECU 216 to determine changes in tire pressure. In some embodiments, the communication interface 214 is configured to transmit resonance parameters to the ECU 216.

The inventor has appreciated that by shifting at least a part of the resonance parameters analysis to the digital signal processing unit 210 within the sensor housing 204 (i.e., upstream of communication interface 214) an improved measurement of resonance parameters can be achieved. This is because digital signal processing unit 210 operates directly upon a high resolution digital sensor signal sampled synchronously at a high sampling rate, rather than upon a low resolution (1 Bit) digital signal sampled asynchronously at a low rate produced by an ABS protocol (e.g., as shown in FIG. 1).

Figure 3:
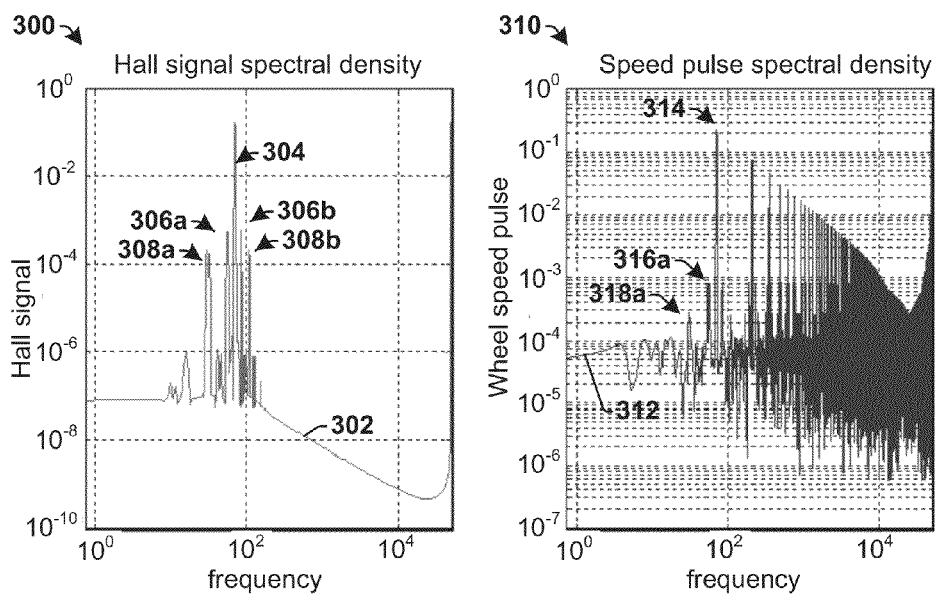
FIG. 3 illustrates graphs comparing a quality of data provided by a sensor signal measured by a magnetic field sensor and a quantized signal received by an electronic control unit.

For example, FIG. 3 illustrates graphs 300 and 308 that compare the quality of data available within the tire pressure sensor (e.g., at DSP 210) and a quality of data available at an ECU (e.g., at ECU 216).

Graph 300 illustrates a spectral density of a sensor signal 302 measured by a magnetic field sensor (available prior to digital signal processing). The spectral density of the sensor signal 302 shows variations in the magnetic field of a pole wheel (y-axis) as a function of frequency (x-axis). Alternating pole pairs of equal length distributed over a perimeter of the pole wheel result in a wheel speed having a frequency that is greater than a rotational rate of the tire (e.g., 40 pole pairs results in a frequency that is 40 times the rotational rate of the tire).

For example, the wheel speed of the tire is illustrated by the highest peak 304 in the spectrum, which is located at approximately 71 Hz. The resonance vibrations/modes of the tire are illustrated as sidebands around the wheel speed signal in the spectrum. For example, sidebands 306a and 306b, located at approximately 15 Hz to the left and right of peak 304, correspond to a first (e.g., radial) oscillation mode, while sidebands 308a and 308b, located at approximately 45 Hz to the left and right of peak 304, correspond to a second (e.g., lateral) oscillation mode.

Graph 310 illustrates a quantized signal 312 provided to an ECU (available after digital signal processing). The quantized signal illustrates zero crossings of the sensor signal that have been determined according to the common practice of wheel speed sensor protocols (e.g., quantization is performed by comparator that determines a frequency of crossings between a sensor signal with an average of the sensor signal). The quantized signal 312 comprises additional noise added during quantization of the sensor signal. While the wheel speed is still noticeable as a highest peak 314, the low sampling rate and accuracy of the communication interface (e.g., a communication interface operating an ABS protocol) causes the noise of the system to be amplified so that sidebands corresponding to the first oscillation modes 316 and the second oscillation modes 318 are extremely close to the noise level.

Therefore, graphs 300 and 310 provide a comparison of the quality of data that is available on the sensor side and on the ECU side. The signal to noise and distortion ratio (SNDR) of graph 300 is approximately two orders of magnitude lower than that of graph 310. Thus, by determining resonance frequencies within a sensor (i.e., prior to the communication interface), an improvement in tire pressure measurements can be achieved.

Figure 4:
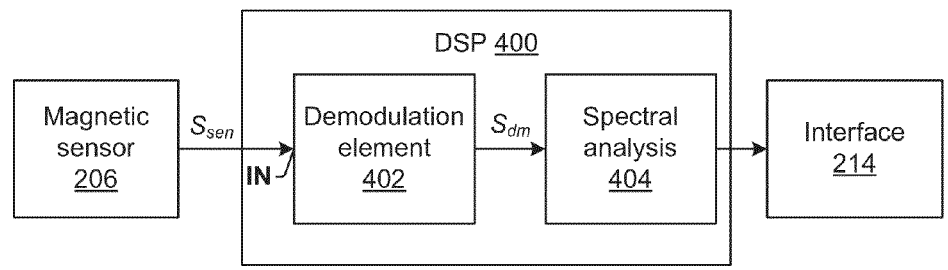
FIG. 4 illustrates one embodiment of a digital signal processing unit comprised within a disclosed indirect TPMS.

FIG. 4 is a block diagram of a digital signal processing unit 400 comprised within a disclosed indirect tire pressure monitoring system (TPMS). The digital signal processing unit 400 comprises a demodulation element 402 and a spectral analysis element 404.

The demodulation element 402 comprises an input node IN connected to an output of a magnetic field sensor 206. The input node IN receives a modulated sensor signal $S_{sen}$ from the magnetic field sensor 206. The demodulation element 402 is configured to perform frequency demodulation of the modulated sensor signal $S_{sen}$ to generate a demodulated signal $S_{dm}$, having a lower frequency bandwidth for signals that are of interest than the modulated sensor signal $S_{sen}$, which indicates a wheel speed and one or more resonance oscillations. For example, in some embodiments, the demodulation element 402 is configured to demodulate a received high frequency sensor signal $S_{sen}$ to a demodulated signal $S_{dm}$ having DC components corresponding to a wheel speed and sideband frequencies corresponding to a first and second oscillations. In some embodiments, the demodulation element is configured to rectify or square a time derivative of the sensor signal to get a FM demodulated signal.

The spectral analysis element 404 is configured to receive the demodulated signal $S_{dm}$ from the demodulation element 402 and from the demodulated signal $S_{dm}$ to determine a wheel speed and one or more resonance frequencies. Demodulating the sensor signal $S_{sen}$ prior to performing spectral analysis provides for a demodulated signal with a smaller frequency range that simplifies spectral analysis of the modulated sensor signal.

Figure 5:
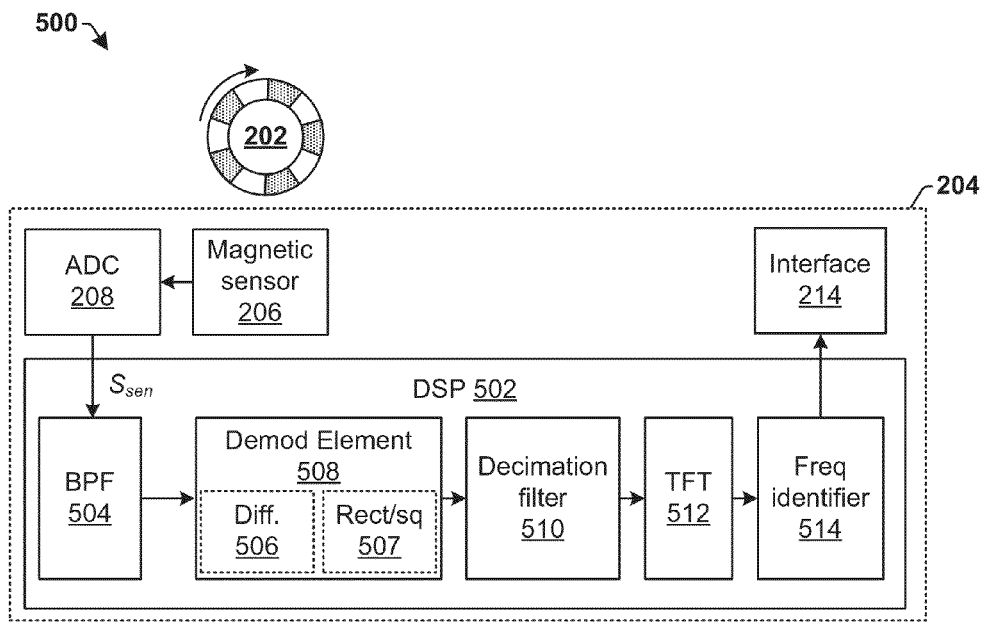
FIG. 5 illustrates a block diagram of an alternative embodiment of a digital signal processing unit comprised within a disclosed indirect TPMS.

FIG. 5 illustrates a block diagram of an alternative embodiment of a digital signal processing unit 502 comprised within a disclosed indirect tire pressure monitoring system (TPMS) 500.

The disclosed indirect TPMS 500 comprises a wheel speed sensor (e.g., an ABS sensor) having a pole wheel 202 and a magnetic field sensor 206. The pole wheel 202 is configured to generate a magnetic field that oscillates at a frequency that can exceed 10 KHz (e.g., a frequency of oscillation of a magnetic field is equal to: (a pole count of the pole wheel·speed of car)/($2\pi$·wheel radius)). Vibrational oscillations of a tire modulate the rotational speed of a tire with a periodic signal located at resonance frequencies of the wheel speed.

The magnetic field sensor 206 generates a modulated sensor signal $S_{sen}$ corresponding to the magnetic field. An analog-to-digital converter (ADC) 208 is configured to convert the modulated sensor signal $S_{sen}$ to a digital sensor signal that is provided to the digital signal processing unit 502. In order to accurately resolve sideband frequencies, the ADC 208 is configured to operate at a high rate of sampling of the magnetic signal. For example, in order to resolve the sideband frequency with a spectral resolution of 1 Hz, for a wheel speed sensor having a frequency of 10 KHz, the Nyquist theorem requires at least 20,000 samples (e.g., 2·10 Khz/1 Hz) captured at a sampling frequency of 20,000 samples/s.

By operating the ADC 208 to sample the modulated sensor signal $S_{sen}$ at high sampling rate with good resolution, TPMS 500 is less sensitive to noise than a conventional TPMS that uses a pulsed signal of an ABS protocol. This is because the high sampling rate decrease the impact of noise in the sensor signal around zero crossings. For example, a fast Fourier transform performed on a higher sampling rate gives equal distribution of noise at every point of curve, not amplified noise around zero crossings.

The digital signal processing unit 502 comprises a bandpass filter 504 configured to receive the digital sensor signal and to filter the sensor signal $S_{sen}$ according to a pass band that is positioned around a frequency corresponding to an actual wheel speed. In some embodiments, the pass band of the bandpass filter 504 is configured to change as an actual wheel speed changes, so as to reduce noise in the sensor signal.

The filtered sensor signal is provided to a demodulation element 508. The demodulation element 508 is configured to perform a demodulation function that demodulates the filtered sensor signal. Demodulating the filtered sensor signal results in a lower frequency signal having a smaller bandwidth relative to the modulated sensor signal that allows for analysis of the samples to be focused on a fixed frequency range of the reduced bandwidth. Therefore, the number of samples required to resolve the sidebands is reduced since the range of the frequency of the wheel speed is reduced (e.g., from 10 Khz to 100 Hz).

In some embodiments, the demodulation element 508 may comprise a differentiation element 506 and a rectification/squaring element 507 configured to collectively perform an asynchronous FM demodulation. For example, in some embodiments, the demodulation element 508 differentiates the digitized magnetic field and then and rectifies or squares the derivative to deliver a signal that is proportional to the slew rate of the magnetic field signal and thus further proportional to the frequency of the magnetic field signal and finally proportional to the wheel speed. The resulting demodulated signal has DC components that are proportional to the wheel speed (e.g., the higher the value of the DC signal the higher wheel speed) and sidebands at the one or more resonance frequencies.

The demodulated signal is provided to a decimation filter 510. In some embodiments, the decimation filter 510 may comprise a low pass filter (e.g., having a pass band below 100 Hz) configured to remove further noise from the demodulated signal and to reduce a sampling rate of the demodulated signal (e.g., to between 100 Hz and 1 KHz to output 128 and 1024 samples). Operating the decimation filter 510 to reduce the sampling rate of the demodulated signal simplifies downstream processing. In some embodiments, the decimation filter 510 is configured to reduce the sampling rate to a minimum sampling rate allowed by a Nyquist criteria.

A time frequency transform unit 512 (e.g., fast Fourier transform (FFT) calculation unit, a discrete Fourier Transform (DFT) calculation unit, a filter bank, etc.) is configured to perform a time to frequency transformation on samples of the demodulated signal output from the decimation filter from the time domain to the frequency domain (e.g., to perform a fast Fourier transform upon the samples) to generate a spectral density of the demodulated signal). The time frequency transform unit 512 provides the spectral densities of the individual harmonics of the demodulated sensor signal as a function of frequency to make the effect of the resonance oscillations detectable.

In some embodiments, the output of the time frequency transform unit 512 is provided to a frequency identifier 514. The frequency identifier is configured to identify peaks in the spectral density of the demodulated signal corresponding to a wheel speed and/or one or more resonance frequencies. By finding a wheel speed and/or resonance frequencies of the spectral density, the amount of data that a communication interface 214 has to transfer to an electronic control unit (ECU) can be reduced. For example, identifying and transmitting values and frequencies of the highest peaks and sidebands of a spectral density reduces an amount of data transmitted to the ECU to a subset of the spectral lines produced by the FFT calculation unit 512. In alternative embodiments, the frequency identifier 514 can be replaced by a processing element configured to implement a data compression algorithm (e.g., a lossy data compression) that compresses the data output from the FFT calculation unit 512.

Figure 6:
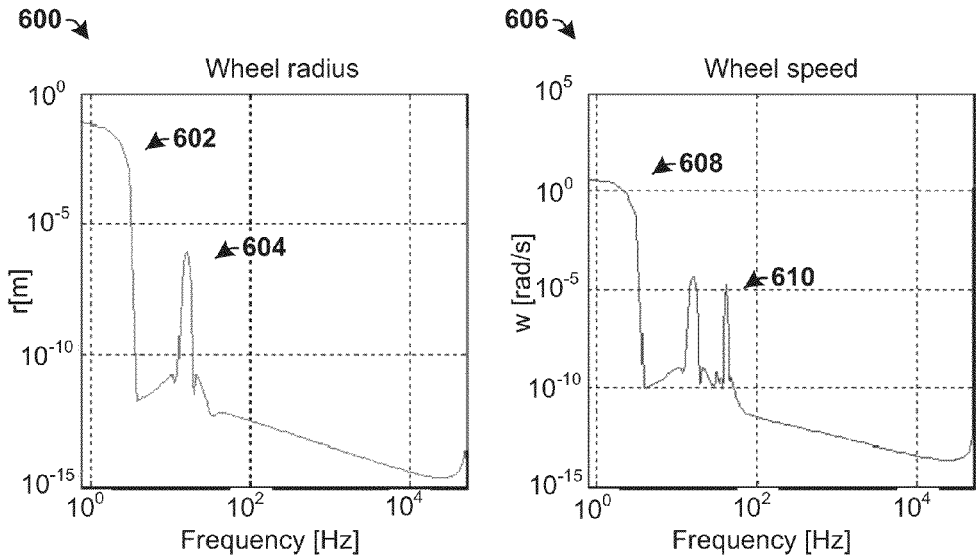
FIG. 6 illustrates graphs showing changes in tire radius as a function of frequency and a graph showing changes in tire speed as a function of frequency.
Figure 7:
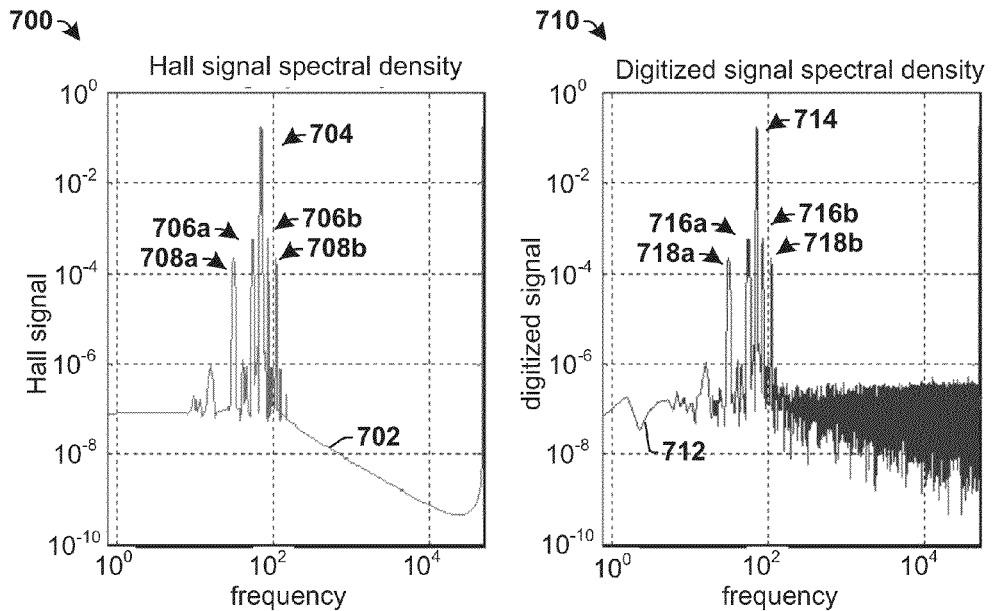
FIG. 7 illustrates graphs showing an exemplary spectral density of a sensor signal and a digitized sensor signal.
Figure 8A:
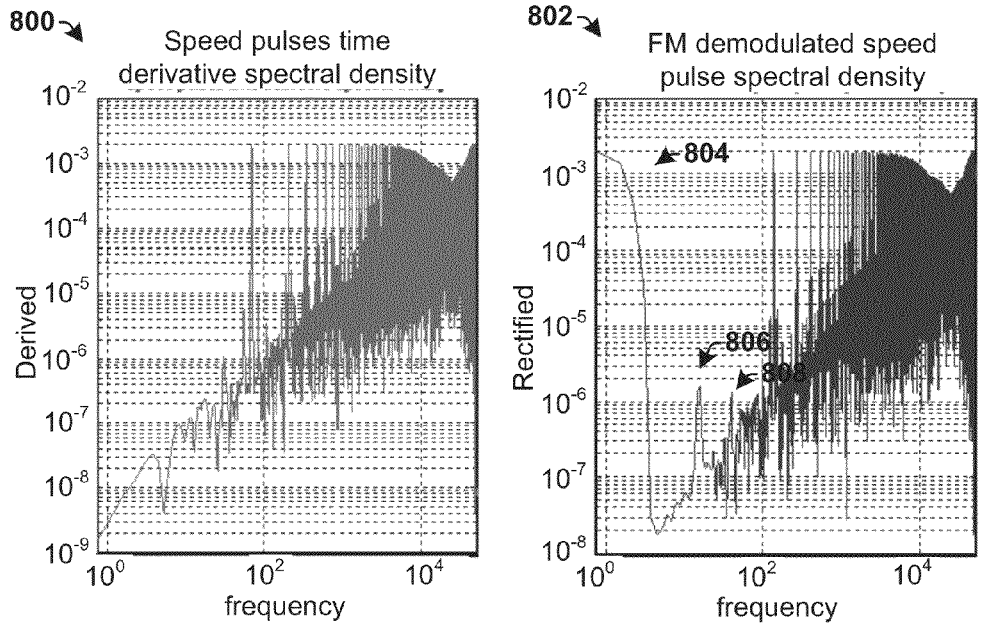
FIGS. 8A-8B illustrates graphs showing a time derivative of a speed pulse signal and a corresponding demodulated speed pulse signal.
Figure 8B:
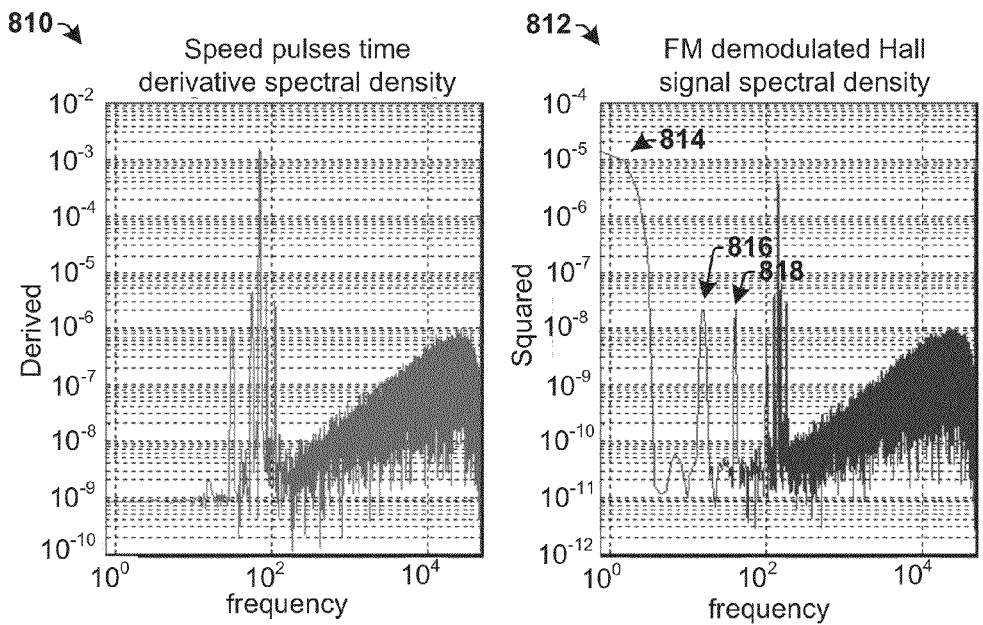

FIGS. 6-8B show graphs of signals at different points along the signal processing chain of the indirect TPMS system 500. FIGS. 7-8B are illustrated as fast Fourier transforms at different points to illustrate the frequency peaks and sidebands.

FIG. 6 illustrates a graph 600 showing changes in tire radius (y-axis) as a function of frequency (x-axis). In graph 600, the DC value of the radius of the wheel is shown at 602. As further shown in graph 600, mechanical resonance oscillations of a tire cause radial vibrations that change a radius of the tire at a resonance frequency of approximately 15 Hz. The radial vibrations are illustrated by a first sideband 604 located at approximately 45 Hz.

FIG. 6 further illustrates a graph 606 showing changes in the angular velocity of a tire (y-axis) as a function of frequency (x-axis). In graph 606', the DC value of the wheel is shown at 608. As further shown in graph 606, a change in a radius of the tire at approximately 45 Hz causes a change in the angular velocity at a same frequency of approximately 45 Hz. The change in angular velocity is illustrated by a first sideband 610 located at approximately 45 Hz.

FIG. 7 illustrates graphs, 700 and 708, showing how the use of a magnetic sensor signal provides for improved resolution of a quantized signal.

Graph 700 illustrates a spectral density of a sensor signal 702 measured by a magnetic field sensor. The illustrated spectral density is caused by a magnetic field of a pole wheel having 40 alternating pole pairs of equal length distributed over its perimeter, resulting in a signal having zero crossings at a frequency that is 40 times the rotation rate of the tire. The speed of the tire is illustrated as the highest peak 704 in the spectral density, located at approximately 71 Hz. The resonance signals that are generated by resonance oscillation of the tire are found as sidebands around the highest peak 704 in the spectral density. For example, sidebands 706a and 706b, located at approximately 15 Hz to the left and right of peak 704, correspond to radial oscillation modes, while sidebands 708a and 708b, located at approximately 45 Hz to the left and right of peak 704, correspond to lateral oscillation modes.

Graph 710 illustrates a spectral density of a quantized signal 712. The spectral density shows an AD (analog-to-digital) converted version of graph 700. The quantized signal 712 comprises an 11-bit digitized representation formed inside the tire pressure sensor. Quantizing the signal spectrum with an 11-bit resolution provides for an improved signal to noise ratio of sidebands, 716 and 718, in comparison to the quantized signal of graph 310 (i.e., compared to a 1-bit in an ECU located downstream of an ABS interface).

FIG. 8A illustrates the time derivative of the speed pulse signal and its demodulation used to achieve asynchronous demodulation for a conventional indirect TPMS.

Graph 800 illustrates the time derivative of the speed pulse signal. The noise of the speed pulse (graph 310) is illustrated in the time derivative with a spectral density that increases with the frequency.

Graph 802 illustrates the rectification of the time derivative of the speed pulse signal in graph 800. In the demodulated spectrum, 804 illustrates a DC value of the actual wheel speed, a first sideband 806 represents radial oscillations at approximately 15 Hz, and a second sideband 808 represents lateral oscillations at approximately 45 Hz.

FIG. 8B illustrates the time derivative of the speed pulse signal and its demodulation used to achieve asynchronous demodulation for a disclosed indirect TPMS.

Graph 810 illustrates the time derivative of the speed pulse signal. The noise of the speed pulse (graph 708) is low compared to graph 800 due to the high sampling rate and the AD converter resolution of 11 bit in the TPMS sensor housing.

Graph 812 illustrates the squared time derivative of the speed pulse signal in graph 808. In the demodulated spectrum, 814 illustrates a DC value of the actual wheel speed, a first sideband 816 represents radial oscillations at approximately 15 Hz, and a second sideband 818 represents lateral oscillations at approximately 45 Hz. The sidebands, 816 and 818, show clear high peaks above the noise floor located at approximately 15 Hz and at approximately 40 Hz, respectively. For example, the signal to noise ratio of sidebands, 816 and 818, is almost 3 db.

Figure 9:
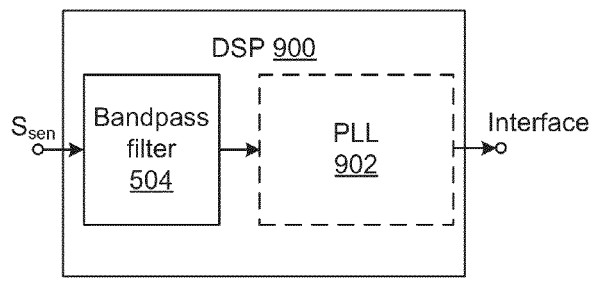
FIGS. 9-11 are block diagrams of alternative embodiments of a digital signal processing unit comprised within a disclosed indirect tire pressure monitoring system (TPMS).

FIG. 9 illustrates a block diagram of an alternative embodiment of a digital signal processing unit 900 comprised within a disclosed indirect tire pressure monitoring system (TPMS).

The digital signal processing unit 900 comprises a bandpass filter 504, a demodulation element 508, and a decimation element 510, as described above. The digital signal processing unit 900 comprises a phase-locked loop 902 configured to perform demodulation and analysis of a received sensor signal $S_{sen}$.

The phase-locked loop 902 is configured to receive a modulated sensor signal $S_{sen}$, to lock onto a frequency of the modulated sensor signal $S_{sen}$, and to provide an output signal having a frequency that is substantially equal to the frequency of the output signal. As the frequency of the modulated sensor signal $S_{sen}$ changes (e.g., depending on a change in tire pressure), the phase-locked loop 902 follows the changes.

In particular, the phase-locked loop 902 comprises a control loop connected to an oscillator (e.g., a digitally controlled oscillator or a voltage controlled oscillator). The control loop is configured to provide a demodulated sensor signal as the output signal to the interface and as a control signal to the oscillator. The control signal changes the speed of the oscillator, causing the phase-locked loop 902 to lock onto a sensor signal corresponding to an actual frequency of rotation of a tire and to generate an output signal that represents a demodulation of the FM modulated sensor signal. For example, if the speed of the wheel increases, the frequency of the magnetic sensor signal increases and the control signal causes the oscillator speed increases, such that the control signal represents the speed (i.e., a 'demodulated' magnetic field signal). The phase-locked loop 902 also provides filtering of the sensor signal according to a transfer function of the phase-locked loop 902.

In some embodiments, the phase-locked loop 902 may be configured to have a capture range (e.g., a frequency range the PLL is able to lock-in, starting from unlocked condition) having a frequency where a carrier signal (e.g., a frequency equal to wheel rotations per second multiplied by number of pole pairs of the pole wheel) is expected.

Figure 10:
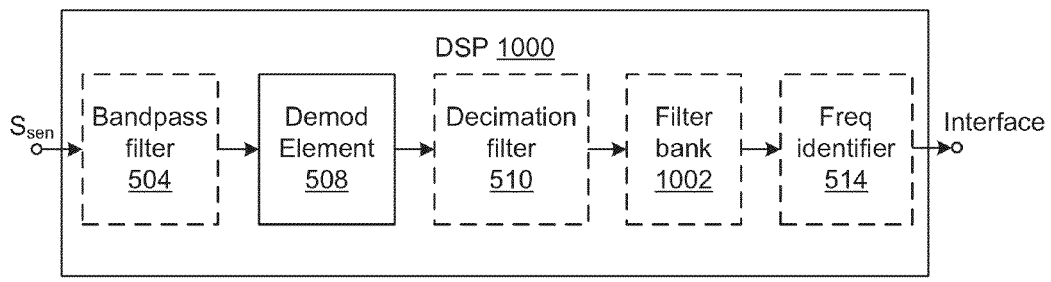

FIG. 10 illustrates a block diagram of an alternative embodiment of a digital signal processing unit 1000 comprised within a disclosed indirect tire pressure monitoring system (TPMS).

The digital signal processing unit 1000 comprises a filter bank 1002 comprising a bank of filters configured to perform spectral analysis of the demodulated signal output from demodulation element 508. In some embodiments, the filter bank 1002 comprises a plurality of band-pass filters, each of which corresponds to a different region in the spectrum of the demodulated signal (i.e., having one band-pass filter per channel to do the filtering). The filter bank 1002 can be designed to provide a spectral analysis with any degree of frequency resolution depending on the size of the channels.

Figure 11:
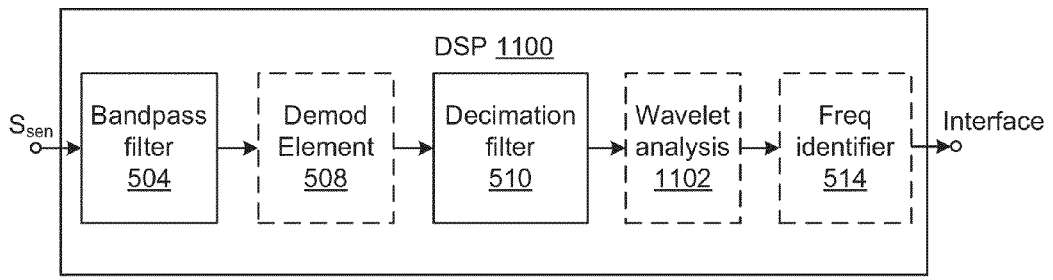

FIG. 11 illustrates a block diagram of an alternative embodiment of a digital signal processing unit 1100 comprised within a disclosed indirect tire pressure monitoring system (TPMS).

The digital signal processing unit 1100 comprises a processor 1102 configured to execute a wavelet analysis algorithm to perform spectral analysis of a demodulated signal. The wavelet analysis algorithm expands the received demodulated signal into a set of basis functions comprising wavelet transforms localized in time and frequency. The wavelet transforms can be used to generate a wavelet spectrum of the signal that expresses the demodulated signal in terms of scaled and translated waves. The processor 1102 may manipulate features of the wavelet transforms at different scales independently to suppress or strengthen particular features of the wavelet transforms.

Figure 12:
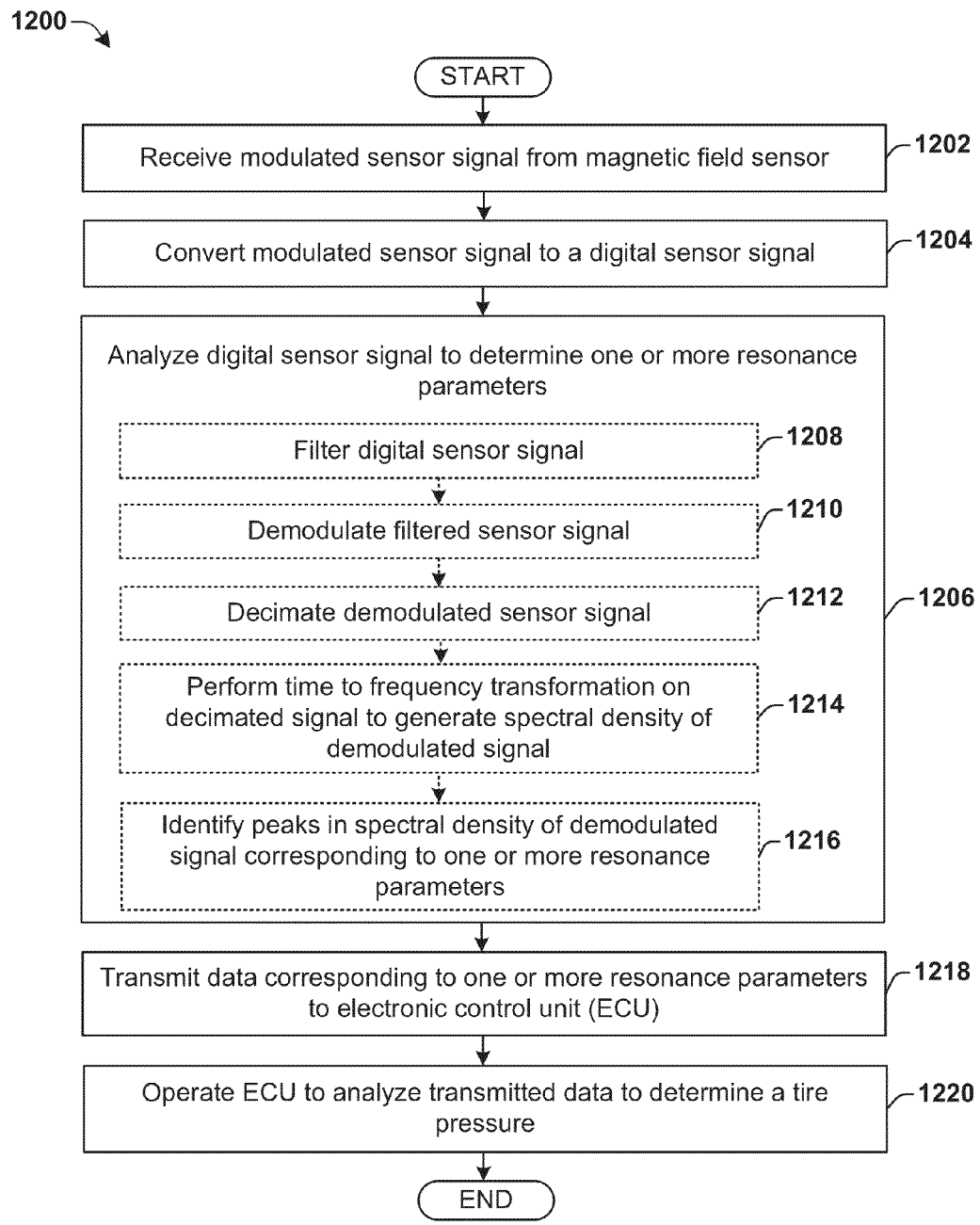
FIG. 12 is a flow diagram of an exemplary method of detecting tire pressure through measuring a wheel speed and one or more resonance frequencies.

FIG. 12 is a flow diagram of an exemplary method 1200 of detecting tire pressure through measuring resonance parameters of a tire.

It will be appreciated that while method 1200 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

At 1202, a modulated sensor signal is received from a magnetic field sensor. The modulated magnetic field is indicative of one or more resonance parameters of an automobile tire.

At 1204, the modulated sensor signal is converted to a digital sensor signal. In some embodiments, the sensor signal is converted to a digital signal by an analog-to-digital converter having a high sampling rate (e.g., an 8-bit ADC, a 16-bit ADC, etc.)

At 1206, the digital sensor signal is analyzed to determine one or more resonance parameters. The one or more resonance parameters may comprise a resonance frequency or a q-factor corresponding to a resonance frequency. In some embodiments, the digital sensor signal may be analyzed to determine a wheel speed also. In some embodiments, analysis of the sensor signal to determine the one or more resonance parameters comprises demodulating a received sensor signal and then determining a peak frequency corresponding to a wheel speed and one or more sidebands corresponding to resonance frequencies of a tire.

For example, in one embodiment a sensor signal is filtered by a bandpass filter to remove noise, at 1208. The filtered sensor signal is then demodulated, at 1210, to generate a demodulated signal having a frequency lower than the modulated sensor signal. In some embodiments, the sensor signal is demodulated by rectifying or squaring a time derivative of the sensor signal to get an asynchronous FM demodulated signal.

The demodulated signal may be optionally decimated to reduce a sampling rate of the signal, at 1212. The decimated signal is then time frequency transformed, at 1214, to generate a spectral density having DC components corresponding to a wheel speed and sidebands corresponding to a first (e.g., radial) and second (e.g., angular) resonance. In various embodiments, the time to frequency transformation may comprise a FFT, a DFT, wavelet analysis, or operation by a filter bank.

In some embodiments, frequency peaks in the spectral density corresponding to the one or more resonance parameters are identified at 1216. For example, a highest peak identified peak may correspond to a wheel speed and identified sidebands may correspond to one or more resonance frequencies.

At 1218, data corresponding to the one or more resonance parameters is transmitted to an electronic control unit (ECU). In some embodiments, the data comprises frequency peaks in the spectral density corresponding to the one or more resonance parameters. In other embodiments, the data comprises a low frequency part of the spectral density of the demodulated signal, such that a low frequency part of the spectral density is transmitted or compressed and transmitted to the ECU without detection of the frequency peaks in the spectral density.

At 1220, the ECU is operated to analyze the transmitted data to determine a tire pressure.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions

What is claimed is:

1. An indirect tire pressure monitoring system (TPMS), having a sensor housing comprising:
   a magnetic field sensor configured to detect a modulated magnetic field indicative of one or more resonance parameters of an automobile tire and to generate a modulated sensor signal based upon the modulated magnetic field;
   an analog-to-digital converter (ADC) configured to convert the modulated sensor signal to a digital sensor signal;
   a digital signal processing unit configured to receive the digital sensor signal and to perform analysis of the digital sensor signal to determine the one or more resonance parameters; and
   a communication interface configured to transmit data corresponding to the one or more resonance parameters to an electronic control unit (ECU).

2. The indirect TPMS of claim 1, wherein a sensor housing comprises the magnetic field sensor, the ADC, the digital signal processing unit, and the communication interface.

3. The indirect TPMS of claim 2, wherein the digital signal processing unit comprises:
   a demodulation element configured to demodulate the modulated sensor signal to generate a demodulated signal having a reduced bandwidth relative to the digital sensor signal; and
   a spectral analysis element configured to receive the demodulated signal, and from the demodulated signal to determine the one or more resonance parameters.

4. The indirect TPMS of claim 3, wherein the digital signal processing unit comprises a time frequency transform unit configured to perform a time to frequency transformation of the demodulated signal to generate a spectral density of the demodulated signal.

5. The indirect TPMS of claim 4, wherein the time frequency transform unit comprises a fast Fourier transform calculation unit.

6. The indirect TPMS of claim 4, further comprising:
   a decimation filter disposed within the sensor housing at a location downstream of the demodulation element and upstream of the time frequency transform unit, wherein the decimation filter is configured reduce a sampling frequency of the demodulated signal.

7. The indirect TPMS of claim 4, further comprising:
a frequency identifier disposed within the sensor housing at a location downstream of the time frequency transform unit and configured to determine frequency peaks in the spectral density corresponding to the one or more resonance parameters.

8. The indirect TPMS of claim 3, wherein the digital signal processing unit comprises a phase-locked loop configured to receive the digital sensor signal, to lock onto a frequency of the digital sensor signal that represents the wheel speed, and to provide an output signal that controls the locked oscillator and represents the wheel speed.

9. The indirect TPMS of claim 3, further comprising:
a bandpass filter disposed within the sensor housing at a location upstream of the demodulation element.

10. The indirect TPMS of claim 1, wherein the one or more resonance parameters comprise a resonance frequency or a q-factor of a resonance.

11. An indirect tire pressure monitoring system (TPMS), comprising:
a magnetic field sensor configured to generate a modulated sensor signal corresponding to a measured magnetic field indicative of one or more resonance parameters of an automobile tire; and
an analog-to-digital converter (ADC) configured to sample the modulated sensor signal and to provide a digital signal, based upon the samples, to a demodulation element configured generate a demodulated signal having a lower frequency than the modulated sensor signal;
a spectral analysis element configured to receive the demodulated sensor signal and to perform analysis of the sensor signal to determine the one or more resonance parameters; and
a communication interface configured to transmit data corresponding to the one or more resonance parameters to an electronic control unit (ECU).

12. The indirect TPMS of claim 11, wherein the spectral analysis element comprises a time frequency transform unit configured to perform a time to frequency transformation of the demodulated signal to generate a spectral density of the demodulated signal.

13. The indirect TPMS of claim 12, further comprising:
a decimation filter disposed at a location downstream of the demodulation element and upstream of the time frequency transform unit, wherein the decimation filter is configured to reduce a sampling rate of the demodulated signal.

14. The indirect TPMS of claim 11, wherein the spectral analysis element comprises a phase-locked loop configured to receive the digital sensor signal, to lock onto a frequency of the digital sensor signal that represents the wheel speed, and to provide an output signal that controls the locked oscillator and represents the wheel speed.

15. The indirect TPMS of claim 11, further comprising:
a bandpass filter disposed at a location upstream of the demodulation element.

16. The indirect TPMS of claim 11, further comprising:
a frequency identifier disposed within the sensor housing at a location downstream of the FFT calculation unit and configured to determine frequency peaks in the spectral density corresponding to a wheel speed and to one or more resonance frequencies.

17. The indirect TPMS of claim 11, wherein the communication interface is configured to transmit or compress and transmit a low frequency part of a spectral density of the demodulated signal to the ECU without detection frequency peaks in the spectral density.

18. A method of measuring a tire pressure, comprising:
receiving a modulated sensor signal from a magnetic field sensor disposed within a sensor housing configured to detect a modulated magnetic field indicative of a wheel speed and one or more resonance frequencies of an automobile tire;
converting, using an analog to digital converter disposed within a sensor housing, the modulated sensor signal to a digital sensor signal;
performing analysis, using a digital signal processing unit disposed within a sensor housing, of the digital sensor signal to determine the one or more resonance parameters; and
transmitting data, using a communication interface disposed within a sensor housing, corresponding to the one or more resonance parameters to an electronic control unit (ECU).

19. The method of claim 18, wherein performing analysis of the digital sensor signal comprises:
demodulating the received digital sensor signal to generate a demodulated signal having a reduced bandwidth relative to the digital sensor signal; and
performing spectral analysis of the demodulated signal to determine the one or more resonance parameters.

20. The method of claim 19, further comprising:
filtering the digital sensor signal prior to demodulating the received digital sensor signal.

21. The method of claim 19, further comprising:
decimating the demodulated signal prior to reduce a sampling rate of the demodulated signal.

22. The method of claim 18, wherein performing spectral analysis of the digital signal comprises performing a time to frequency transformation of the demodulated signal to generate a spectral density of the demodulated signal.

23. The method of claim 18, further comprising:
identifying frequency peaks in the spectral density corresponding to a wheel speed and to one or more resonance frequencies.

24. The method of claim 18, further comprising:
transmitting or compressing and transmitting a low frequency part of a spectral density of the demodulated signal without detection of frequency peaks in the spectral density.

* * * * *